(12) United States Patent
Kojima et al.

(10) Patent No.: US 11,247,575 B2
(45) Date of Patent: Feb. 15, 2022

(54) VEHICLE EQUIPPED WITH POWER STORAGE DEVICE

(71) Applicant: Toyota Jidosha Kabushiki Kaisha, Toyota (JP)

(72) Inventors: Koichi Kojima, Toyota (JP); Takashi Yamana, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/775,996

(22) Filed: Jan. 29, 2020

(65) Prior Publication Data

US 2020/0247261 A1    Aug. 6, 2020

(30) Foreign Application Priority Data

Feb. 1, 2019    (JP) .............................. JP2019-017104

(51) Int. Cl.
| | |
|---|---|
| *B60L 53/16* | (2019.01) |
| *H02J 7/00* | (2006.01) |
| *B60L 53/66* | (2019.01) |
| *B60R 25/24* | (2013.01) |
| *B60R 25/30* | (2013.01) |
| *B60R 25/34* | (2013.01) |
| *B60R 25/01* | (2013.01) |

(52) U.S. Cl.
CPC .............. *B60L 53/16* (2019.02); *B60L 53/66* (2019.02); *H02J 7/00034* (2020.01); *H02J 7/007188* (2020.01); *B60R 25/01* (2013.01); *B60R 25/24* (2013.01); *B60R 25/30* (2013.01); *B60R 25/34* (2013.01)

(58) Field of Classification Search
CPC .... B60L 53/16; B60L 53/66; H02J 7/007188; H02J 7/00034; B60R 25/30; B60R 25/34; B60R 25/01; B60R 25/24
USPC .................................................. 320/107, 109
See application file for complete search history.

(56) References Cited

U.S. PATENT DOCUMENTS

| | | | |
|---|---|---|---|
| 9,527,391 B2 | 12/2016 | Hockenstrom et al. | |
| 2015/0061594 A1* | 3/2015 | Hockenstrom | B60L 53/22 320/109 |

FOREIGN PATENT DOCUMENTS

| | | | |
|---|---|---|---|
| JP | 2007-236172 A | | 9/2007 |
| JP | 2015035309 A | * | 2/2015 |
| KR | 20180006753 A | * | 1/2018 |

* cited by examiner

*Primary Examiner* — Richard Isla
*Assistant Examiner* — Manuel Hernandez
(74) *Attorney, Agent, or Firm* — Dinsmore & Shohl LLP

(57) ABSTRACT

A charger is permitted to perform external charging of a power storage device in a connector locked state in which a charging connector is locked to a charge inlet by a connector lock device. An ECU releases the connector locked state in conjunction a door unlock operation of releasing a door locked state placed by a door lock mechanism. When the external charging of the power storage device by the charger is cancelled by the connector locked state being released, a different charging stop history, depending on presence or absence of a predetermined user operation after the external charging is cancelled, is stored into a storage device.

8 Claims, 9 Drawing Sheets

VEHICLE EQUIPPED WITH POWER STORAGE DEVICE

CROSS REFERENCE TO RELATED APPLICATIONS

This nonprovisional application claims priority to Japanese Patent Application No. 2019-017104 filed on Feb. 1, 2019 with the Japan Patent Office, the entire content of which is hereby incorporated by reference.

BACKGROUND

Field

The present disclosure relates to a vehicle, and, more particularly, to a vehicle which includes a power storage device that is chargeable using power supplied from a power supply external to the vehicle (hereinafter, also referred to as an "external power supply") via an electrical connection.

Description of the Background Art

Japanese Patent Laying-Open No. 2007-236172 discloses a vehicle which includes a connector lock device for locking a connector, provided at the end of a cable for charging a power storage device mounted on the vehicle with power from an external power supply (hereinafter, also simply referred to as "external charging") while the connector is connected to an inlet. Providing the connector lock device can prevent mischief or theft of the cable during the external charging.

Furthermore, Japanese Patent Laying-Open No. 2007-236172 discloses enabling unlocking of the connector lock with a vehicle key, without directly performing a connector unlock operation. This allows the locked connector to be automatically unlocked in response to a vehicle lock open (unlock) operation, including unlocking a door. Thus, the user convenience improves.

According to Japanese Patent Laying-Open No. 2007-236172, the connector lock process is automatically invoked upon connection of the connector to the vehicle, whereas the connector lock process is not tied to lock (including door lock) operations with a vehicle key.

SUMMARY

In various charging standards, it is typical that conditions for performing external charging include the connector as being locked. External charging is not permitted while the connector is being unlocked. For this reason, if a user performs an operation for unlocking a door during external charging, the external charging is stopped by the connector being automatically unlocked upon the user operation.

Accordingly, with the vehicle having the connector lock device as disclosed in Japanese Patent Laying-Open No. 2007-236172, as a door unlock operation is performed during external charging, the external charging is stopped in conjunction with a door being unlocked. Furthermore, even though the user performs a door lock operation again, a connector locked state is not automatically formed. Thus, the external charging cannot be resumed automatically.

Due to this, in the case where the user performs a door unlock operation during external charging for purposes other than starting the operation of the vehicle, the external charging cannot be resumed unless the connector locked state is re-formed by the user performing an operation such as unplugging and plugging the connector back to the vehicle. As a result, although the user is not intended to stop the external charging, if the external charging is cancelled before its completion due to the door unlock operation, the vehicle may be left thereafter. In this case, when starting the operation of the vehicle, the user may be discomforted by the result of the external charging.

In contrast, in the case where the user discontinues the external charging and starts driving the vehicle, the connector is unlocked in conjunction with the door unlock operation and the external charging stops, after which the connector is unplugged from the inlet.

The both cases above are common in that the external charging is stopped in conjunction with the door unlock operation by the user. Thus, the cause of the user discomfort, mentioned above, cannot be troubleshot unless a history of charge stops (hereinafter, also simply referred to as a "charging stop history") is kept appropriately, which may leave the user dissatisfied.

The present disclosure is made to solve the above problems, and an object of the present disclosure is to save, when external charging of a vehicle is cancelled by unlocking the connector, the charging stop history so that information for troubleshooting a cause of user discomfort can be provided.

A vehicle mounted with a power storage device, according to a certain aspect of the present disclosure, includes a charge inlet; a connector lock device; a charger; and a control device. The charge inlet is provided so that a connector provided at an end of a cable is to be electrically connected for supplying power from a power supply external to the vehicle. The connector lock device mechanically locks the connector electrically connected to the charge inlet. The charger is permitted to charge the power storage device using power conveyed to the charge inlet, in a connector locked state in which the connector lock device mechanically locks the connector to the charge inlet. The control device instructs the connector lock device in the connector locked state to transition to a connector unlocked state in conjunction with a first user operation, the connector unlocked state being a state in which the connector is released from being mechanically locked, the first user operation being different from a user operation of directly instructing the connector lock device to release from the connector locked state. The control device further stores a charging stop history when charging of the power storage device by the charger is cancelled due to formation of the connector unlocked state during the charging, the charging stop history being different depending on presence or absence of a predetermined second user operation performed after the charging is cancelled.

According to the above vehicle, if there are: a case where the first user operation is performed, intended to start operation of the vehicle accompanied with cancellation of external charging; and a case where the first user operation is performed without intention to cancel external charging, these cases cannot be distinguished by only information obtained when charging is stopped. However, the cases can be distinguished by keeping the charging stop history based on monitoring the second user operation after the charging is stopped. This allows the charging stop history to be saved in a manner contributing to troubleshooting of a cause of user discomfort by the cancellation of the external charging.

The foregoing and other objects, features, aspects and advantages of the present disclosure will become more apparent from the following detailed description of the present disclosure when taken in conjunction with the accompanying drawings.

DETAILED DESCRIPTION

An embodiment according to the present disclosure will be described in detail, with reference to the accompanying drawings. In the figures, the same reference signs are used to refer to the same or like parts, and the description will not be repeated. In the following, while description will be given with reference to a vehicle being a plug-in hybrid vehicle, the vehicle to which the present disclosure is applied is not limited to the plug-in hybrid vehicle, insofar as the vehicle is equipped with a power storage device. The vehicle may be an electric vehicle that is not equipped with an engine. In the following, an electronic control unit will be referred to as an "ECU."

Figure 1:
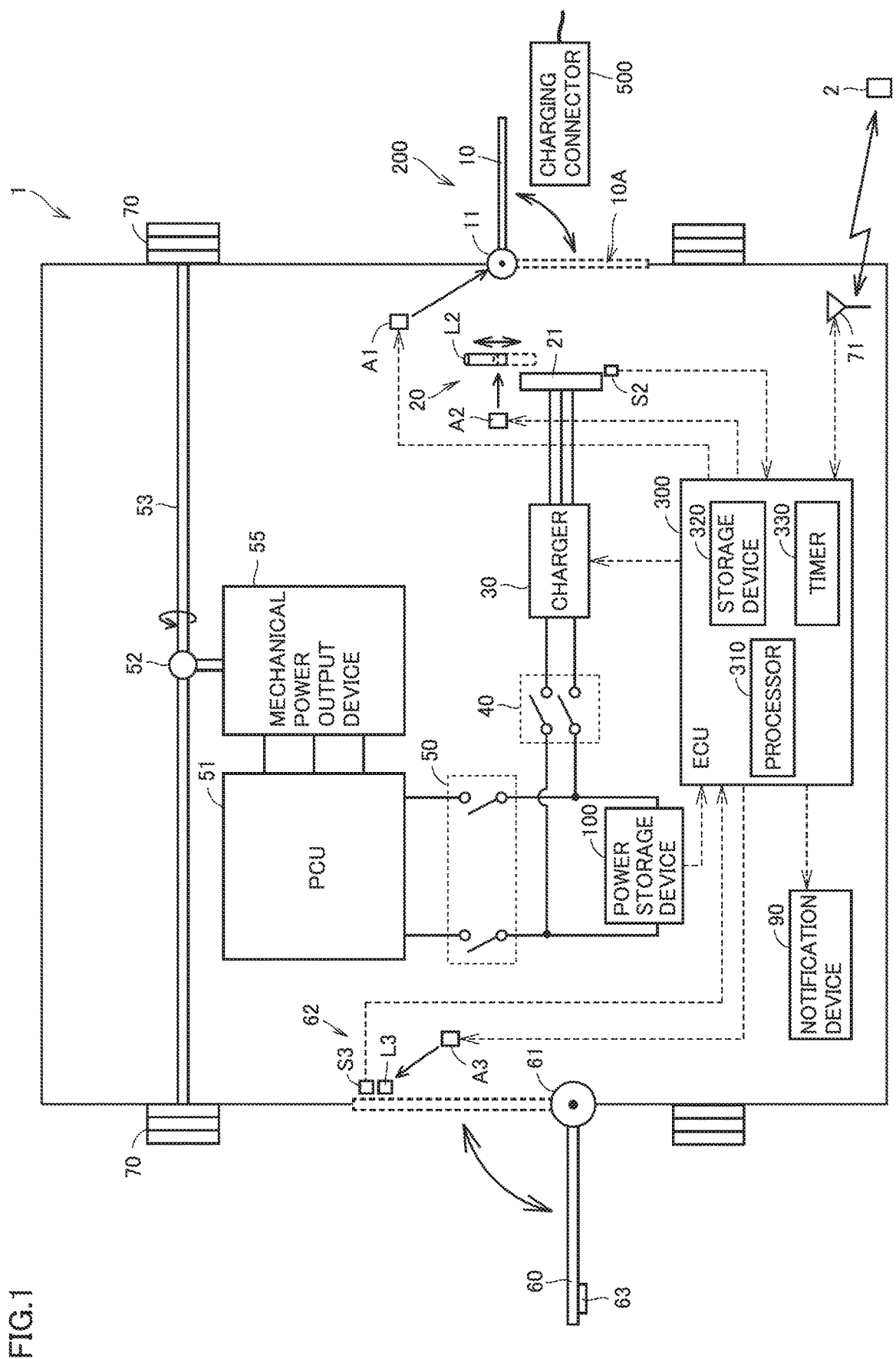
FIG. 1 is a schematic configuration diagram of a vehicle according to an embodiment of the present disclosure.

FIG. 1 is a schematic configuration diagram of a vehicle according to the present embodiment.

Referring to FIG. 1, as a configuration for running, a vehicle 1 includes a power storage device 100, a system main relay (SMR) 50, a power control unit (PCU) 51, a mechanical power transmission gear 52, a drive shaft 53, a mechanical power output device 55, driving wheels 70, and an ECU 300.

Power storage device 100 is a rechargeable direct-current (DC) power supply, and includes, for example, a nickel-metal hydride secondary battery or a lithium-ion secondary battery. Alternatively, a large capacitor can be employed as power storage device 100. Power storage device 100 can accumulate power to be used to run the vehicle.

Mechanical power output device 55 collectively represents devices for rotationally driving the driving wheels 70. The torque output from mechanical power output device 55 is transmitted to drive shaft 53 via mechanical power transmission gear 52, and causes drive shaft 53 to rotate. Driving wheels 70 (e.g., front wheels) of vehicle 1 are attached to both sides of drive shaft 53, and rotate in conjunction with drive shaft 53.

Mechanical power output device 55 includes a motor generator (not shown) which generates a rotational force using power from power storage device 100. During braking of vehicle 1, the motor generator is capable of generating a charging power for power storage device 100, using the rotational force by driving wheels 70.

If vehicle 1 is a hybrid vehicle, mechanical power output device 55 further includes an engine not shown. For example, the rotational force generated by the engine can be transmitted via mechanical power transmission gear 52 to drive shaft 53, in parallel with the rotational force by the motor generator. Alternatively, all or some of the output power of the engine may be used to generate charging power for power storage device 100 by rotationally driving separate motor generators.

PCU 51 includes an inverter and/or a converter for converting power between the motor generator and power storage device 100. SMR 50 is connected between power storage device 100 and PCU 51, and controlled between on and off by ECU 300.

As SMR 50 is turned on, power storage device 100 and PCU 51 are electrically connected to each other, thereby making vehicle 1 ready to travel using the power stored in power storage device 100. In contrast, when SMR 50 is off, vehicle 1 is unable to travel.

Vehicle 1 further includes a charger 30 (in-vehicle charger), a charge relay 40, a door 60, an opening/closing mechanism 61, a door lock device 62, an antenna 71, a notification device 90, and a power receiver 200.

Power receiver 200 includes a charge inlet 21 which is connected to a charging connector 500 provided at the end of a charging cable for supplying vehicle 1 with power from an external power supply.

Charger 30 collectively represents power converters for converting the power, transmitted from outside the vehicle 1 to charge inlet 21, into power for charging power storage device 100. A charge relay 40, whose on and off are controlled by ECU 300, is disposed between charger 30 and power storage device 100. As charge relay 40 is turned on, vehicle 1 is made ready for external charging for power storage device 100 using the power received through charge inlet 21. In contrast, as charge relay 40 is turned off, vehicle 1 is unable to perform external charging.

ECU 300 includes a processor 310, a storage device 320, and a timer 330. For example, a central processing unit (CPU) can be employed as processor 310. Storage device 320 includes a RAM (Random Access Memory) for temporarily storing data, and storages (e.g., ROM (Read Only Memory) and a rewritable nonvolatile memory) storing various information. ECU 300 corresponds to one embodiment of a "control device," and storage device 320 corresponds to one embodiment of a "storage unit."

Timer 330 notifies processor 310 of the arrival of a set time. As the time set to timer 330 arrives, timer 330 transmits to processor 310 a signal for notifying the processor 310 of this.

Besides programs used for various controls, various parameters used in the programs are also pre-stored in the storages included in storage device 320. Alternatively, various operations histories (logs) of vehicle 1 can be written and stored into storage device 320. The various controls can be performed by processor 310 executing the programs stored in storage device 320. Note that the various controls are not limited to processing by software, and they can be processed by dedicated hardware (electronic circuits) as well.

Upon a request from ECU 300, notification device 90 performs a given notification process for giving a notification to the user (e.g., a driver of vehicle 1). Examples of notification device 90 include a display device (e.g., a meter panel or a head up display), a loudspeaker, and a lamp. Notification device 90 may be a display unit and a loudspeaker of a mobile device (e.g., smartphone), or a display unit and a loudspeaker of a car navigation system.

ECU 300 receives, via antenna 71, a signal (e.g., a radio wave) emitted by an electronic key 2. Electronic key 2 includes a lock button and an unlock button (none of which are shown) which are for operating door lock device 62. Antenna 71 comprehensively represents an outdoor antenna and a charging antenna. For example, the outdoor antenna is provided near door 60, and the charging antenna is provided near power receiver 200. A signal from electronic key 2 for an operation of door lock device 62 (e.g., a signal emitted by electronic key 2 upon depression of the lock button or unlock button by the user) is received by the outdoor antenna.

A signal from electronic key 2 for an operation of power receiver 200 (e.g., a signal for an operation of a connector lock switch 23 described below) is received by the charging antenna. The signal from electronic key 2 is received within a given area on the periphery of each antenna (hereinafter, also referred to as an "antenna coverage"). The antenna coverage is set for each antenna, and set within, for example, about 70 cm around the antenna. When an operation is performed with electronic key 2, ECU 300 performs a given authentication using a signal received from electronic key 2, and enables the operation if the authentication is successful. The operation using electronic key 2 is disabled if electronic key 2 is not present within an antenna coverage corresponding to that operation.

Door 60 is provided with an opening/closing mechanism 61 for opening and closing door 60, and a door lock device 62. Opening/closing mechanism 61 and door lock device 62 are provided for each door 60. For example, a hinge can be employed as opening/closing mechanism 61. Door 60 is coupled to the body of vehicle 1 via opening/closing mechanism 61 (a hinge), thereby enabling an opening, formed in the body of vehicle 1, to be opened and closed.

Door lock device 62 includes a door lock mechanism L3, a door open/close sensor S3, and an actuator A3. Door lock mechanism L3 keeps door 60 closed. While various known mechanisms can be employed as door lock mechanism L3, for example, an engagement member (e.g., a pin or a pawl) which allows switching between engagement/disengagement to/from the closed door 60.

Door open/close sensor S3 detects an open/closed state of door 60 (i.e., whether door 60 is open or closed). A known sensor can be employed as door open/close sensor S3. Examples of door open/close sensor S3 include a limit switch, a proximity sensor, and a photoelectric sensor. A result of detection by door open/close sensor S3 is output to ECU 300.

Actuator A3 drives door lock mechanism L3 to activate it. For example, actuator A3 can include a motor which is controlled by ECU 300. In response to a lock command from ECU 300, the motor included in actuator A3 controls the engagement member to be engaged with door 60. This activates door lock mechanism L3.

In contrast, in response to an unlock command from ECU 300, the motor included in actuator A3 controls the engagement member to be disengaged from door 60. This brings door lock mechanism L3 into an unlocked state (inactivate state). When door lock mechanism L3 is in the unlocked state, the opening and closing operations of door 60 are not prevented.

As door lock mechanism L3 is activated with door 60 closed, the engagement member engages with door 60, thereby keeping door 60 closed no matter what the user operates. In the following, door 60 being kept closed by door lock mechanism L3 may be referred to as "door lock." A state in which all the doors 60 are locked by door lock mechanism L3 may be referred to as a "door locked state." In contrast, a state in which door lock mechanism L3 is in the unlocked state in at least one door 60 may be referred to as a "door unlocked state."

The user operates electronic key 2, thereby switching the door locked state and the door unlocked state. For example, as the user depresses the lock button on electronic key 2 while all the doors 60 are closed, a lock command generated by ECU 300 is sent to each of door lock devices 62 of four doors 60, thereby bringing vehicle 1 into the door locked state.

In contrast, as the user depresses the unlock button on electronic key 2 while vehicle 1 is in the door locked state, an unlock command generated by ECU 300 is sent to each of door lock devices 62 of the four doors 60. This command unlocks all the doors 60, bringing vehicle 1 into the door unlocked state.

An operation switch 63 for locking a door may be provided on the outer surface of each door 60. A user input to operation switch 63 is enabled during a period in which a radio wave from electronic key 2 is received through antenna 71. As such, the user can switch vehicle 1 between the door locked state and the door unlocked state by operating any of electronic key 2 and operation switch 63 for locking a door. Note that, in the following, the switch operation by the user from the "door unlocked state" to the "door locked state" is also referred to as a "door lock operation," and, conversely the switch operation from the "door locked state" to the "door unlocked state" is also referred to as a "door unlock operation."

Next, referring to FIGS. 2 to 4, a configuration of power receiver 200 will be described in detail.

Figure 2:
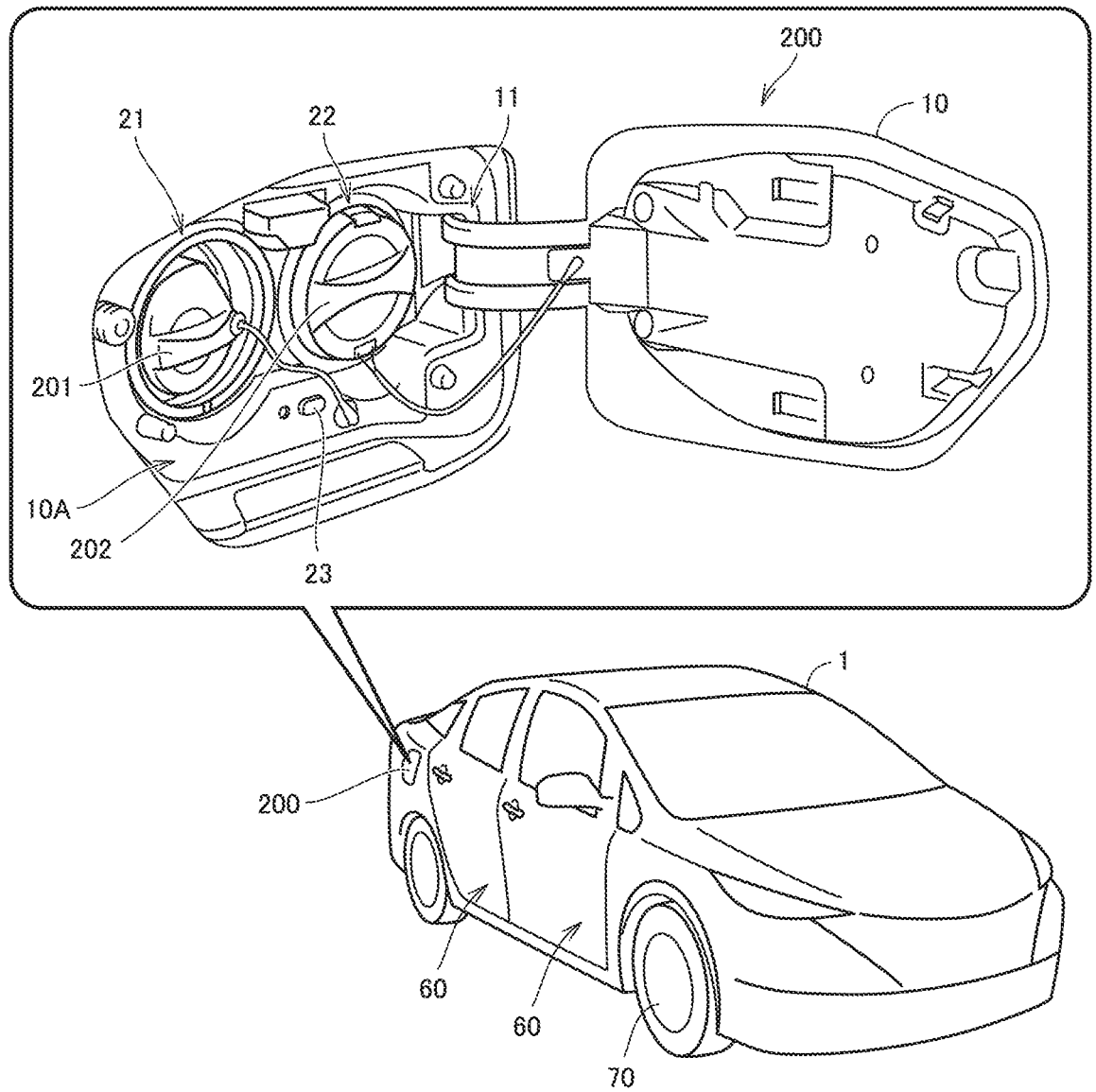
FIG. 2 is an external view for illustrating a detailed configuration of a power receiver shown in FIG. 1.

FIG. 2 is an external view for illustrating a detailed configuration of power receiver 200 shown in FIG. 1.

Referring to FIGS. 2 and 1, in the present embodiment, as one example, power receiver 200 is provided in the rear right (the driver's seat side) of vehicle 1. Power receiver 200 includes a charging lid 10, an opening/closing mechanism 11 for charging lid 10, a connector lock device 20 (FIG. 1), charge inlet 21 for alternating-current (AC) power, a charge inlet 22 for DC power, connector lock switch 23, an actuator A1, and caps 201, 202. Note that FIG. 1 shows only charge inlet 21, among charge inlets 21 and 22.

Actuator A1 close drives opening/closing mechanism 11 for charging lid 10 for charge inlets 21, 22 to close charging lid 10. A hinge (more particularly, a motor-driven hinge) can be employed as opening/closing mechanism 11. Charging lid 10 is coupled to the body of vehicle 1 via opening/closing mechanism 11 (the hinge).

Actuator A1 includes a motor, for example. The motor included in actuator A1 is controlled by ECU 300. Accordingly, as opening/closing mechanism 11 is close driven by actuator A1, opening 10A, formed in the body of vehicle 1, is covered with charging lid 10.

Charge inlets 21, 22 can be electrically connected to connector (the charging connector) 500 of the charging cable. The charging cable includes therein a signal line and a power line. As the connector of the charging cable, coupled to a charging station, is electrically connected to charge inlet 21 or 22, power can be supplied from a power supply of the charging station (i.e., the external power supply) to vehicle 1 through the charging cable. Vehicle 1 and the charging station are also communicably connected via the charging cable. Charge inlet 21 supports charging stations (e.g., typical chargers) that have AC power supply schemes. Charge inlet 22 supports charging stations (e.g., fast chargers) that have DC power supply schemes.

While caps 201, 202 are attached to charge inlets 21, 22, respectively in the state illustrated in FIG. 2, cap 201 or 202 is removed by the user to use charge inlet 21 or 22.

Figure 3:
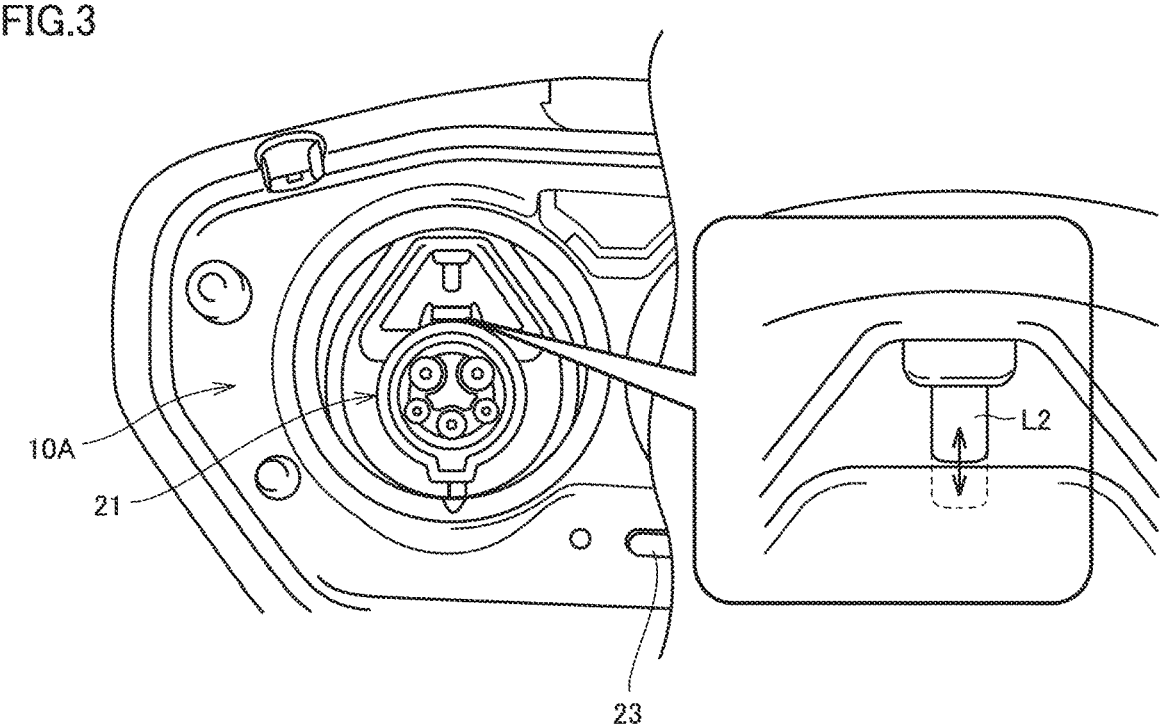
FIG. 3 is an external view of a charge inlet with a cap removed.

FIG. 3 is an external view of charge inlet 21 with cap 201 removed. While charge inlet 21 and connector lock device 20 provided for charge inlet 21 will be described with reference to FIG. 3, the same connector lock device (not shown) is provided for charge inlet 22 as well.

Referring to FIGS. 3 and 1, connector lock device 20 includes a connector lock mechanism L2, a connector connection sensor S2, and an actuator A2. Connector lock mechanism L2 mechanically locks charging connector 500 as being electrically connected to charge inlet 21. Connector connection sensor S2 detects whether charging connector 500 is connected to charge inlet 21 of vehicle 1. A known sensor can be employed as connector connection sensor S2. Examples of connector connection sensor S2 include a limit switch, a proximity sensor, and a photoelectric sensor. A result of detection by connector connection sensor S2 is output to ECU 300.

Actuator A2 is controlled by ECU 300 to drive connector lock mechanism L2. While known various mechanisms can be employed as connector lock mechanism L2, a lock pin, which can move up and down, is employed as connector lock mechanism L2 in this embodiment. In this case, actuator A2 can include a motor (not shown) and a conversion mechanism (not shown) which converts a rotational motion of the motor into a linear motion (more particularly, up-down motion of the lock pin).

As ECU 300 outputs a lock command to actuator A2, actuator A2 lowers the lock pin, thereby bringing connector lock mechanism L2 into the locked state. In contrast, as ECU 300 outputs an unlock command to actuator A2, actuator A2 raises the lock pin, thereby bringing connector lock mechanism L2 into the unlocked state. In the example of FIG. 3, the position of the lock pin when connector lock mechanism L2 is in the locked state is lower than the position of the lock pin when connector lock mechanism L2 is in the unlocked state.

Charging connector 500 is allowed to be connected to charge inlet 21 when connector lock mechanism L2 is in the unlocked state. As connector lock mechanism L2 is brought into the locked state while charging connector 500 is connected to charge inlet 21, the recess provided in charging connector 500 and the lock pin engage with each other, thereby not permitting the user to unplug the charging connector 500 from charge inlet 21. In the following, the state of charging connector 500 being fixedly connected to charge inlet 21 by connector lock mechanism L2 being locked (the lock pin being engaged) will be also referred to as a "connector locked state." Causing connector lock mechanism L2 to transition from the unlocked state to the locked state will be also referred to as a "connector locking."

In contrast, the state of charging connector 500 unpluggable from charge inlet 21 by connector lock mechanism L2 being unlocked (the lock pin being disengaged) will be also referred to as a "connector unlocked state." Causing connector lock mechanism L2 to transition from the locked state to the unlocked state will be also referred to as "connector unlocking." As such, in the present embodiment, the connector locking and the connector unlocking are controlled in response to a command from ECU 300 to actuator A2.

Figure 4:
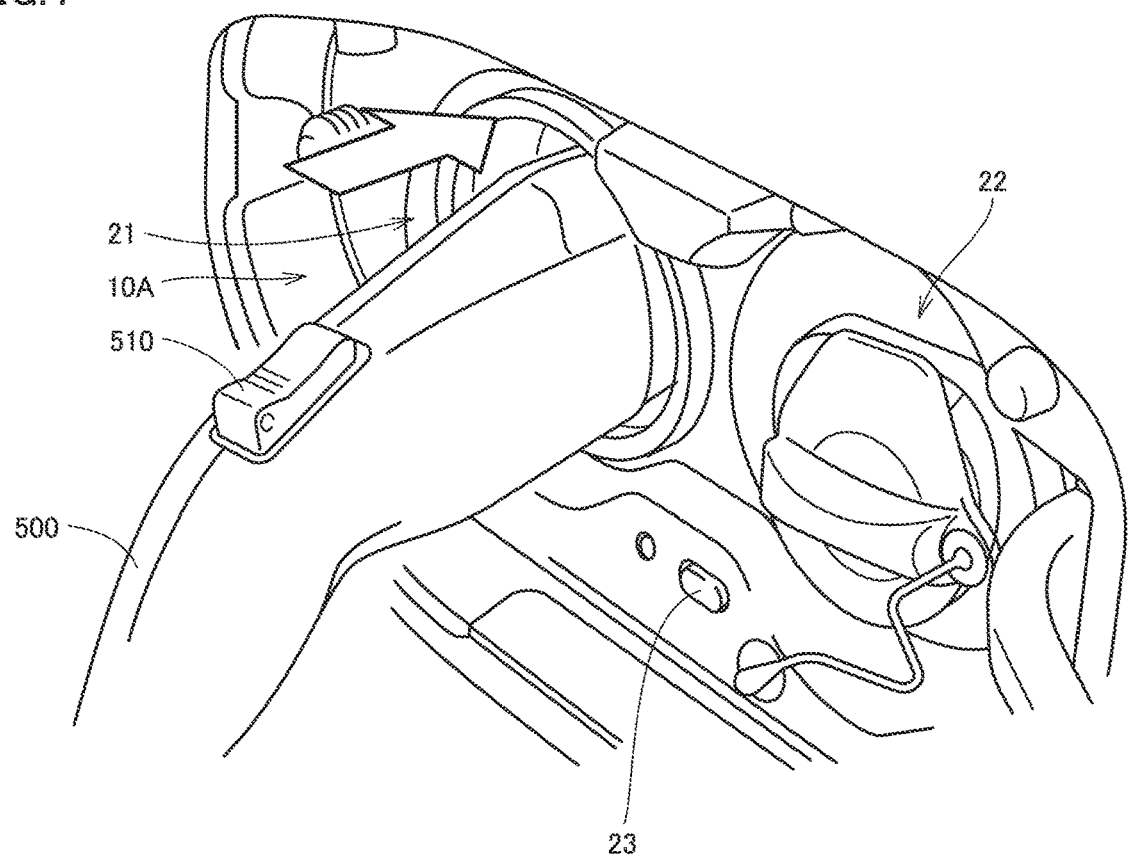
FIG. 4 is a diagram showing a state in which a charging connector is connected to the charge inlet.

FIG. 4 shows an external view of charge inlet 21 having charging connector 500 connected thereto.

Charge inlets 21, 22 are used with charging lid 10 open. As charging lid 10 is opened, charge inlets 21, 22 are exposed from opening 10A. As illustrated in FIG. 4, in order to use charge inlet 21, the user opens charging lid 10, removes cap 201 (FIG. 2), and connects charging connector 500 provided at the end of the charging cable to charge inlet 21.

Charging connector 500 has a connection unlock button 510. The user plugs charging connector 500 into charge inlet 21, without depressing the connection unlock button 510, thereby electrically connecting charging connector 500 to charge inlet 21. As charging connector 500 is electrically connected to charge inlet 21, actuator A2 is controlled by ECU 300, bringing charging connector 500 into the connector locked state. As such, upon connection of charging connector 500, the connector locked state of charging connector 500 can be automatically formed, without the user directly instructing for connector locking of charging connector 500.

Alternatively, power receiver 200 can be provided with a connector lock switch 23 for the user to manually instruct locking and unlocking of the connector. In response to an operation of connector lock switch 23, ECU 300 generates a command for activating actuator A2, thereby allowing connector locking and connector unlocking to be manually switched. Note that the operation of connector lock switch 23 is enabled only when electronic key 2 is present on the periphery (within the above antenna coverage) of the charging antenna (antenna 71).

As charging connector 500 is brought into the connector locked state, a state is formed in which power storage device 100 can be charged with power supplied from the charging station to charge inlet 21 through the charging cable. In contrast, in the connector unlocked state, any one of charging paths from the charging station to power storage device 100 via charge inlet 21 is shut down, thereby not permitting external charging. For example, a switch (not shown) provided within the charging cable and/or charge relay 40 is turned off in conjunction with the connector unlocked state, thereby not permitting external charging. In the event of connector unlocking in the middle of external charging initiated in the connector locked state, charging of power storage device 100 stops.

As such, vehicle 1 according to the present embodiment permits external charging by charger 30 in the connector locked state, and "formation of the connector locked state" is included in conditions for performing external charging. Here, referring to FIG. 5, conditions for transition of charging connector 500 between the connector locked state and the connector unlocked state are organized.

Figure 5:
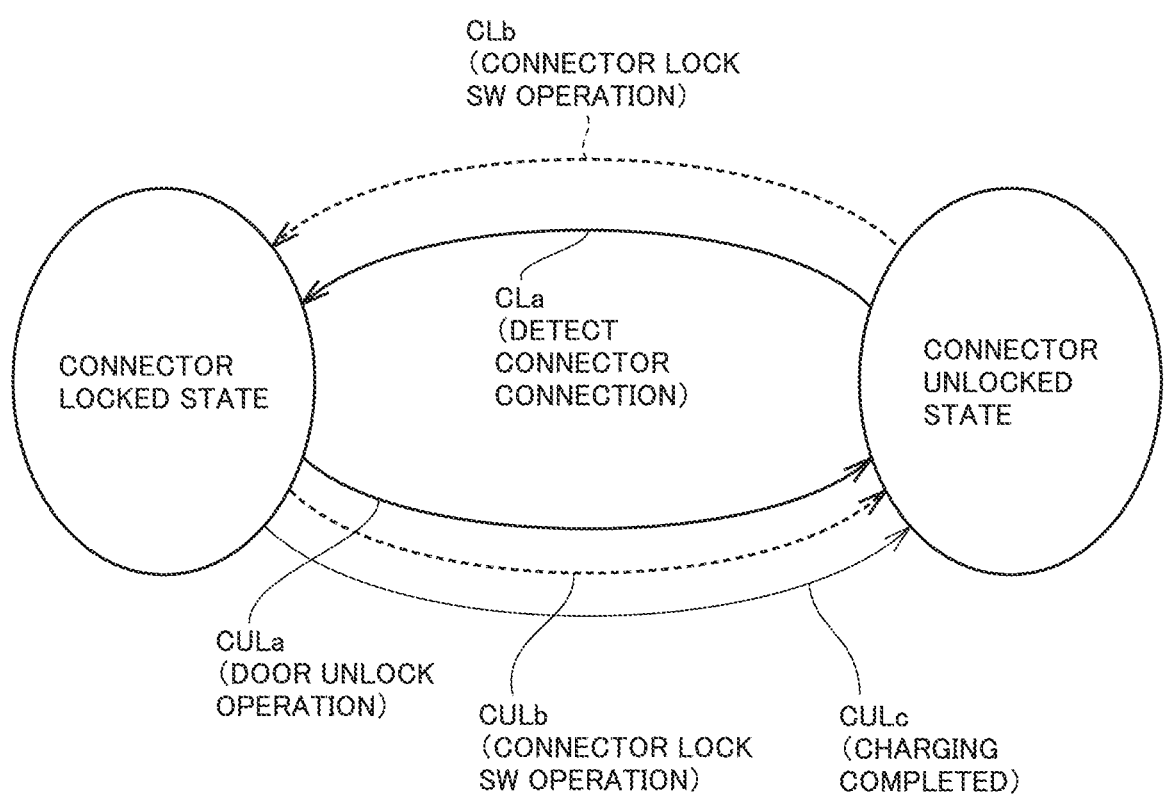
FIG. 5 is a state transition diagram of the charging connector between a connector locked state and a connector unlocked state.

FIG. 5 is a state transition diagram of charging connector 500 between the connector locked state and the connector unlocked state.

Referring to FIG. 5, while charging connector 500 is not connected to charge inlet 21, connector connection sensor S2 detects no connector connection and the connector unlocked state is formed. In this state, as the user electrically connects charging connector 500 to charge inlet 21, connector connection sensor S2 detects the connector connection, in response to which the ECU 300 generates a lock command directed to connector lock mechanism L2 (lock conditions CLa). Upon satisfaction of lock conditions CLa (detecting of the connector connection), charging connector 500 transitions from the connector unlocked state to the connector locked state, and is automatically locked. In other words, ECU 300 determines that lock conditions CLa are satisfied upon a change in output of connector connection sensor S2 from a state indicative of no detection of connector connection to a state indicative of detection of connector connection.

Alternatively, in the connector unlocked state, if ECU 300 senses an operation of connector lock switch 23 while connector connection sensor S2 is detecting connector connection, ECU 300 generates a lock command directed to connector lock mechanism L2 (lock conditions CLb). This satisfies lock conditions CLb (connector lock SW operation) involving the user operation, upon which the charging connector 500 transitions from the connector unlocked state to the connector locked state.

Note that vehicle 1 may not be provided with connector lock switch 23, in which case, the connector locked state can be formed upon satisfaction of lock conditions CLa.

In the connector locked state, connector connection sensor S2 is detecting the connector connection and connector lock mechanism L2 is being controlled to the locked state. If the user performs the door unlock operation with electronic key 2 or the like in the connector locked state, ECU 300 generates an unlock command directed to connector lock mechanism L2 to automatically unlock charging connector 500 in conjunction with door being unlocked (unlock conditions CULa).

Alternatively, in the connector locked state, if ECU 300 senses an operation of connector lock switch 23, ECU 300 generate an unlock command directed to connector lock mechanism L2 (unlock conditions CULb). This satisfies unlock conditions CULb (the connector lock SW operation) involving the user operation of directly instructing unlocking of charging connector 500, upon which charging connector 500 transitions from the connector locked state to the connector unlocked state.

Furthermore, as the external charging in the connector locked state is completed, ECU 300 generates an unlock command directed to connector lock mechanism L2 to automatically unlock charging connector 500 (unlock conditions CULc). For example, the external charging is completed when SOC (State Of Charge) of power storage device 100 has increased to a predetermined end determination value, or upon an elapse of a predetermined charging time or upon arrival of a charge end time set as a timer.

If connector lock switch 23 is not provided, charging connector 500 transitions from the connector locked state to the connector unlocked state upon satisfaction of unlock conditions CULa in conjunction with door unlocking or unlock conditions CULc in conjunction with completion of the external charging.

As such, with vehicle 1 according to the present embodiment, while charging connector 500 being in the connector locked state is included in the conditions required for external charging, the connector is unlocked in conjunction with the door unlock operation. Due to this, external charging may be ended in conjunction with the door unlock operation even though the user is not intended to end the external charging. In other words, the door unlock operation which is not intended to directly instruct for the connector unlocking but is a trigger for the connector unlocking in conjunction therewith, corresponds to one embodiment of a "first user operation."

Figure 6:
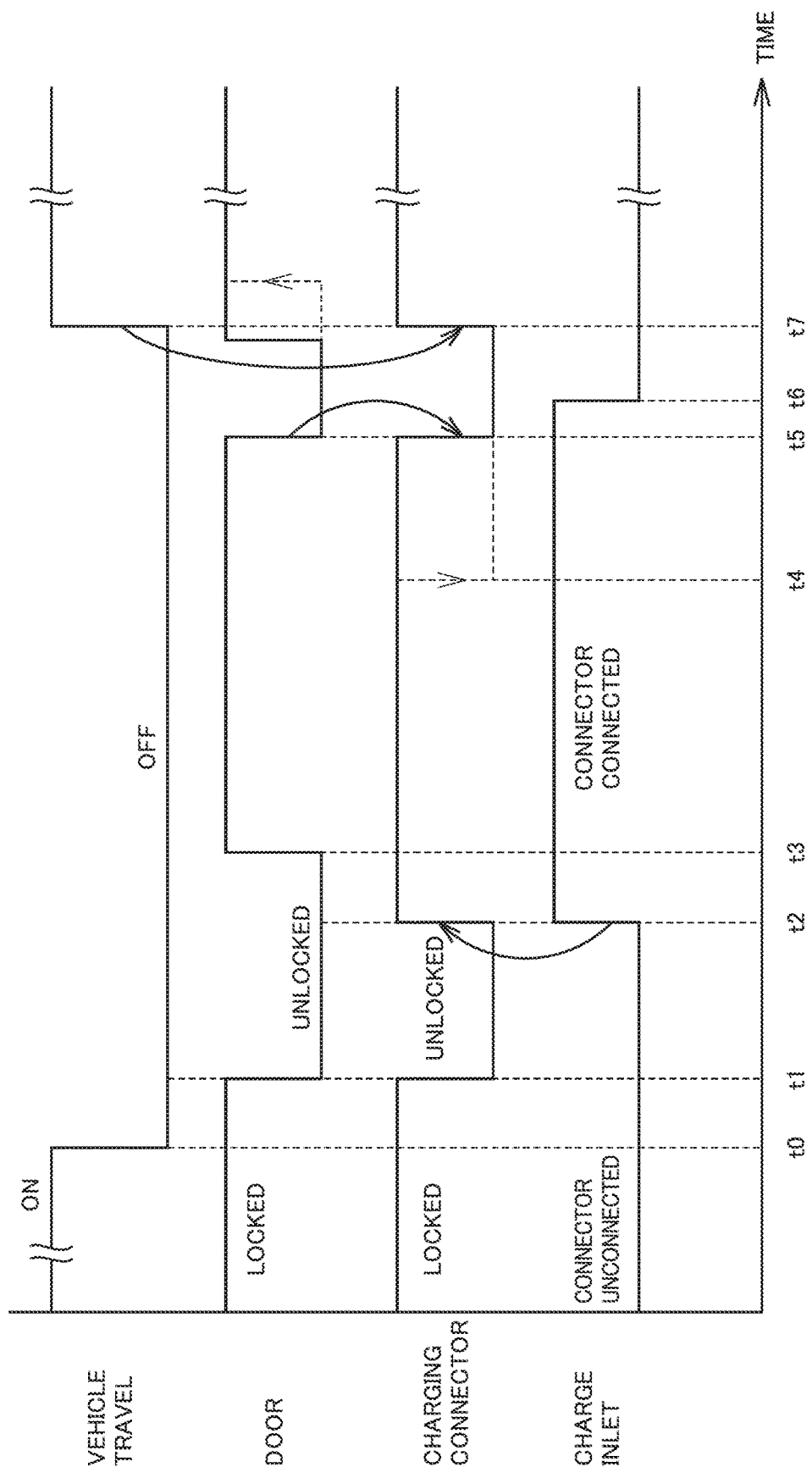
FIG. 6 is a waveform diagram showing a first example of a behavior of the vehicle, involving external charging, from an end of operation of the vehicle to the subsequent start of operation of the vehicle.

FIG. 6 is a waveform diagram showing a first example of a vehicle behavior, involving external charging, from an end of operation of the vehicle to the subsequent start of operation of the vehicle.

Referring to FIG. 6, at and prior to time t0, vehicle 1 is running. While vehicle 1 is running, charging connector 500 is not connected to charge inlet 21, door 60 is locked, and connector lock mechanism L2 is locked.

As the driving of vehicle 1 ends at time t0, the user performs the door unlock operation and gets out of vehicle 1 at time t1. Consequently, an unlock command is given to connector lock mechanism L2 and the connector unlocked state is formed. This makes charging connector 500 ready to be connected to charge inlet 21.

After getting out of vehicle 1, the user prepares the charging cable for external charging, and connects charging connector 500 to charge inlet 21 at time t2. In response to this, lock conditions CLa in FIG. 5 are satisfied, and thus a lock command is given to connector lock mechanism L2 and the connector locked state is formed. This forms a state in which external charging can be started.

After the door lock operation at time t3, the user leaves vehicle 1. After time t3, external charging starts upon arrival of a charge start time, which is pre-set as a timer or calculated back from the required charge energy.

The user performs the door unlock operation at time t5 to drive vehicle 1 again. In response to the door unlock operation, door 60 changes from the locked state to the unlocked state, in conjunction with which the connector lock mechanism L2 also changes from the locked state to the unlocked state. As a result, the external charging is cancelled although it is not completed at that time.

Note that if the external charging is completed before the user performs the door unlock operation (time t4 unlock conditions CULc shown in FIG. 5 are satisfied, and thus connector lock mechanism L2 is controlled to the unlocked state. As a result, the connector unlocked state is already formed at time t5. In this case, connector lock mechanism L2 is maintained at unlocked state at time t5.

After the door unlock operation at time t5, the user unplugs charging connector 500 in the connector unlocked state from charge inlet 21 at time t6. Then, after getting in vehicle 1, the user starts driving vehicle 1 at time t7. At the start of traveling of the vehicle, door 60 is placed in the locked state in response to a switch, provided at the driver's seat, for locking the door. At the start of traveling of the vehicle, typically, a door lock operation from inside the vehicle is performed, rather than a door lock operation performed from outside the vehicle with electronic key 2 or operation switch 63 on the outer surface of door 60. Alternatively, if there is no door lock operation by the user, door can be automatically locked in response to a command from ECU 300 having sensed the start of traveling of the vehicle.

It can be understood that, in the example of FIG. 6, the door unlock operation (time t5), subsequent to the door lock operation at time t3, is a user operation intended to start traveling of the vehicle, including an intention of ending the external charging. In this case, the user is not discomforted by the termination of the external charging caused by the formation of the connector unlocked state in conjunction with the door unlock operation at time t5.

Figure 7:
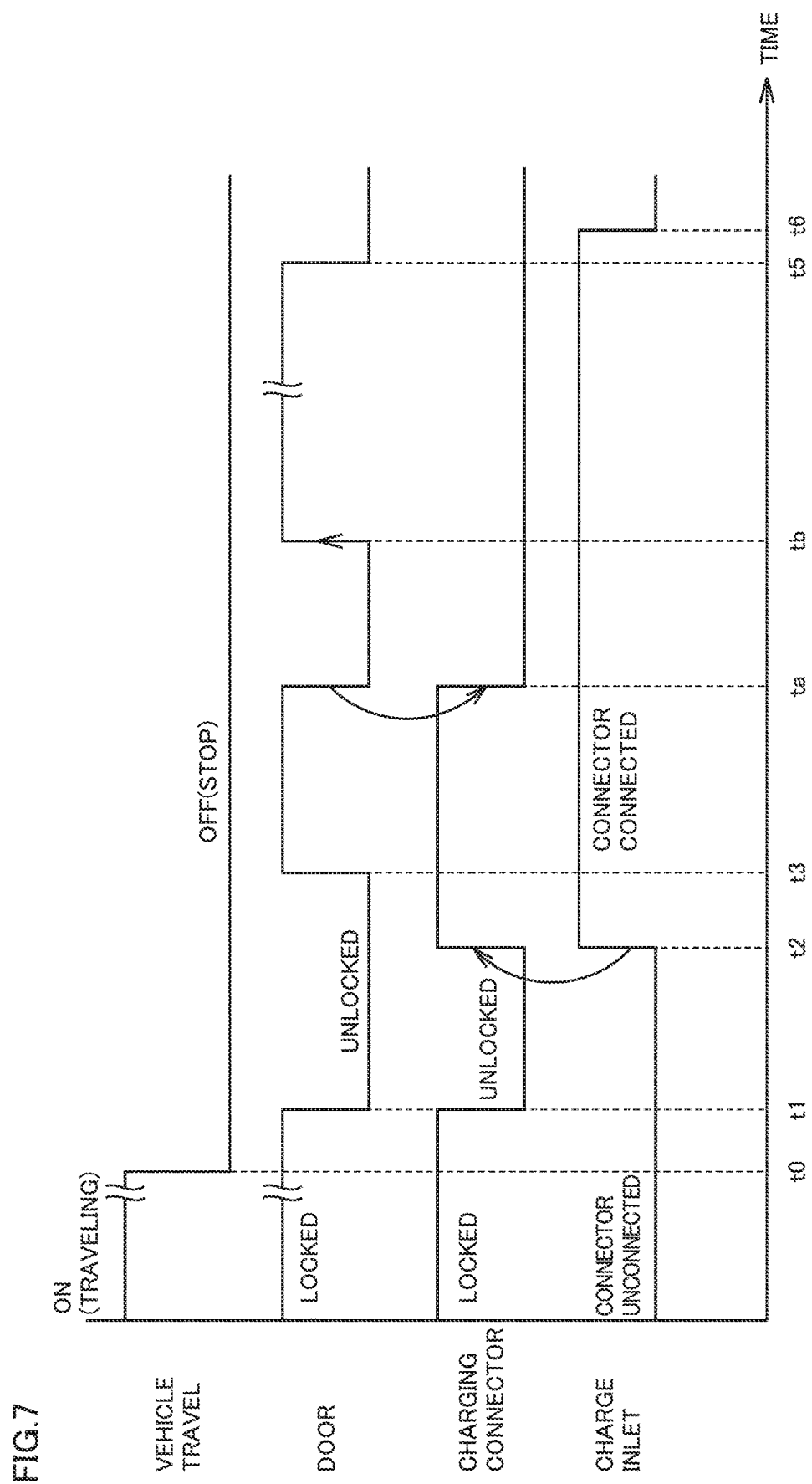
FIG. 7 is a waveform diagram showing a second example of the behavior of the vehicle, involving external charging, from an end of operation of the vehicle to the subsequent start of operation of the vehicle.

FIG. 7 is a waveform diagram showing a second example of the vehicle behavior involving external charging, from an end of operation of the vehicle to the subsequent start of operation of the vehicle. Unlike FIG. 6, the example of FIG. 7 shows a behavior of the vehicle upon a door unlock operation that is not intended to start traveling of the vehicle.

Referring to FIG. 7, the user operations and behaviors of the vehicle up to time t3 are the same as those shown in FIG. 6, and thus the detailed description thereof will not be repeated. In other words, after the end of traveling of the vehicle, the user performs the door lock operation at time t3, and leaves vehicle 1. Then, external charging starts after time t3.

In the example of FIG. 7, at time ta during the external charging, the user performs a door unlock operation not intended to start traveling of the vehicle. For example, the user performs the door unlock operation at time ta to fetch a thing left in the vehicle. This changes door 60 to the unlocked state, in conjunction with which the connector lock mechanism L2 is unlocked, thereby forming the connector unlocked state. This also cancels the external charging at that time.

As the user obtains the thing left in the vehicle, the user, again, performs a door lock operation at time tb, and then leaves vehicle 1. At this time, door 60 is placed in the locked state again, while charging connector 500 is maintained at the unlocked state. This is because the conditions for charging connector 500 to transition from the connector locked state to the connector unlocked state include the door unlock operation, while the conditions for charging connector 500 to transition from the connector unlocked state to the connector locked state do not include the door lock operation, as described with reference to FIG. 5.

For this reason, unless the user operation of unplugging and plugging of charging connector 500 to charge inlet 21 (lock conditions CLa) or the user operation of connector lock switch 23 (lock conditions CLb) is performed after time tb, the connector locked state is not formed, and thus the external charging stopped at time tb is not to be resumed.

As with FIG. 6, the user performs the door unlock operation at time t5 to drive vehicle 1 again, without the external charging being resumed. Then, at time t6, charging connector 500 in the connector unlocked state is unplugged from charge inlet 21, after which traveling of the vehicle starts. However, in the case of FIG. 7, due to the cancellation of external charging, caused by the door unlock operation at time ta, the SOC of power storage device 100 at the start of traveling of the vehicle may be lower than the user intended.

As such, in both examples in FIGS. 6 and 7, the external charging is cancelled in conjunction with the door unlock operation, and the user is discomforted by a result of the external charging in the event of the door unlock operation that is not intended to travel the vehicle (FIG. 7). Accordingly, in order to troubleshoot the cause of the user discomfort, it is necessary to keep a history so that the cases of FIGS. 6 and 7 can be distinguished from each other when external charging is cancelled in conjunction with the door unlock operation.

Figure 8:
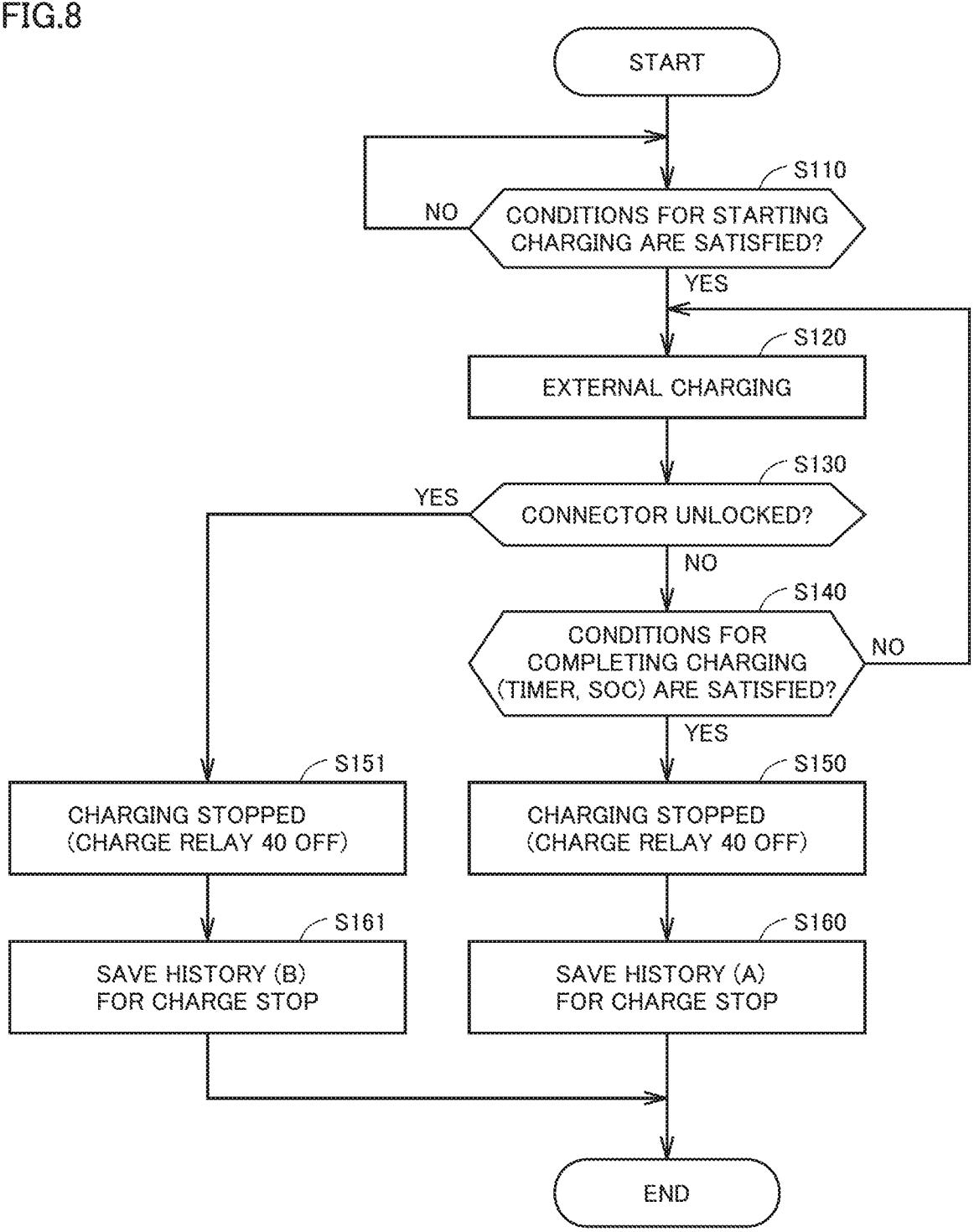
FIG. 8 is a flowchart illustrating Comparative Example of a control process for saving a history when external charging of a vehicle is stopped.

FIG. 8 is a flowchart illustrating Comparative Example of a control process for saving a history when external charging of vehicle 1 is stopped.

Referring to FIG. 8, at step (hereinafter, also simply referred to as "S") 110, ECU 300 determines whether conditions for starting external charging are satisfied. If the conditions are satisfied (YES at S110), ECU 300 performs external charging at S120. As described above, the conditions for starting charging at S110 include "formation of the connector locked state." At S120, charge relay 40 is turned on and charger 30 is activated, and power is thereby conveyed from the external power supply to charge inlet 21 via charging connector 500 (the charging cable), and power storage device 100 is charged with the power.

If the connector locked state is maintained during the external charging (S120) (NO at S130), ECU 300 periodically determines, at S140, whether the conditions for completing the charging based on the SOC or timer setting, as described above, are satisfied. The external charging (S120) continues until the conditions for completing the charging are satisfied (NO at S140). If the conditions for completing the charging are satisfied (YES at S140), ECU 300 passes the process to S150 and performs a charge stop process, including turning off of charge relay 40 and stopping of charger 30. Furthermore, at S160, a history (history (A)) indicating that the external charging is stopped upon satisfaction of the conditions for completing the charging is stored as a charge stop history into storage device 320 (FIG. 1). Note that in response to the charge stop process at S150, the unlock conditions CULc in FIG. 5 are satisfied, upon which the charging connector 500 is controlled to the unlocked state.

In contrast, if charging connector 500 changes from the connector locked state to the connector unlocked state during the external charging (S120) until the conditions for completing the charging are satisfied (NO at S140), YES determination is made at S130, and the process proceeds to S151. ECU 300 performs charge stop process at S151, and stores, at S161, a history (history (B)) indicating that the external charging is stopped by the connector unlock as a charge stop history into storage device 320 (FIG. 1).

In Comparative Example shown in FIG. 8, using the information obtained when the external charging is stopped, history (A) and history (B) can be stored separately. Accordingly, which one of histories (A), (B) is saved allows distinguishing whether the external charging is stopped upon satisfaction of the conditions for completing the charging or whether the external charging is stopped in conjunction with charging connector 500 being changed to the connector unlocked state.

However, in the control process of FIG. 8, YES determination is made at S130 in both cases: in which the external charging is cancelled at time t5 in FIG. 6 in conjunction with the door unlock operation for the purpose of starting the operation of the vehicle; and in which the external charging is cancelled in conjunction with a door unlock operation not intended to start the operation of the vehicle at time to in FIG. 7, and history (B) is saved at S161. As a result, based on the charging stop history created using only the information obtained when the charging is stopped, the cases of FIGS. 6 and 7 cannot be distinguished from each other.

Figure 9:
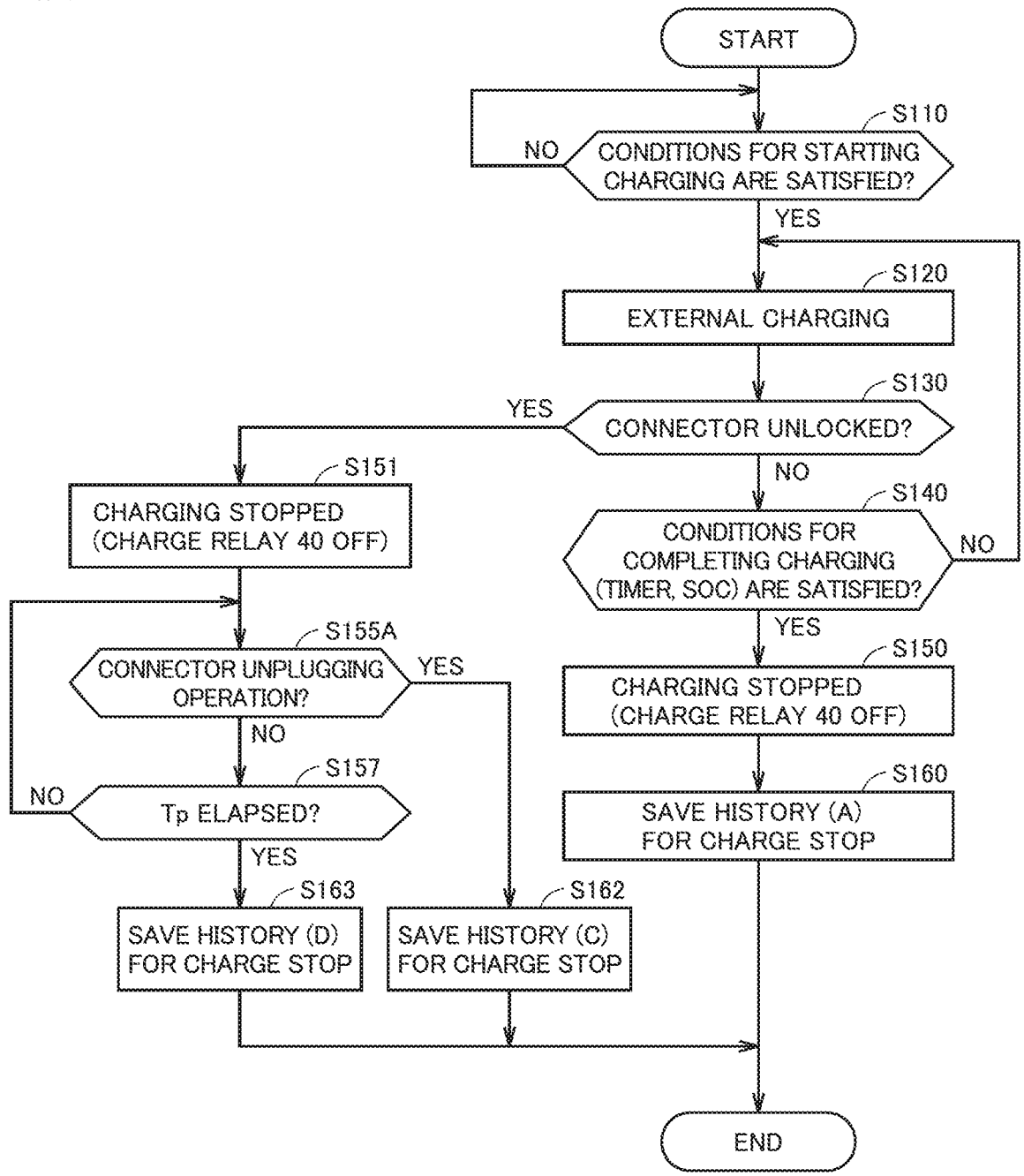
FIG. 9 is a flowchart illustrating a control process for saving a history when external charging of the vehicle according to the embodiment is stopped.

Accordingly, vehicle 1 according to the present embodiment saves a history when external charging is stopped, according to the flowchart as shown in FIG. 9.

Referring to FIG. 9, at S110 to S160, which are the same as those in FIG. 8, ECU 300 controls external charging with the connector locked state maintained. Accordingly, if the conditions for completing the charging are satisfied while the connector locked state is maintained (YES at S140), a charge stop history (A) is saved in storage device 320 (FIG. 1) at S160.

During the external charging (S120) until the conditions for completing the charging are satisfied (NO at S140), if charging connector 500 changes from the connector locked state to the connector unlocked state (YES at S130), ECU 300 performs the same charge stop process as that in FIG. 8 at S151, after which monitors user operations after the formation of the connector unlocked state at S155A and S157. Specifically, presence or absence of a user operation of unplugging of charging connector 500 from charge inlet 21 (connector unplugging operation) is monitored at S155A since the formation of the connector unlocked state until the elapse of a predetermined time Tp (NO at S157). The determination at S155A can be made based on an output of connector connection sensor S2.

If the connector unplugging operation is present (YES at S155A), ECU 30 stores a history (history (C)) as a charge stop history into storage device 320 (FIG. 1) at S162, the history (C) indicating that the external charging is stopped upon a user operation including an intention to stop the charging, involving unplugging of charging connector 500 from charge inlet 21.

In contrast, if there is no user operation of unplugging of charging connector 500 from charge inlet 21 until an elapse of Tp (YES at S157), ECU 30 stores a history (history (D)) as a charge stop history into storage device 320 (FIG. 1) at S163, the history (D) indicating that the external charging is stopped in conjunction with the door unlock operation without involving unplugging of charging connector 500 from charge inlet 21, rather than by a user operation including an intention to stop the charging.

According to the control process of FIG. 9, if the external charging is cancelled in conjunction with the door unlock operation for the purpose of starting the operation of the vehicle at time t5 in FIG. 6, after the process of S151 upon the NO determination at S130, history (C) is saved (S162) in response to the process of unplugging of charging connector 500 at time t6. In contrast, when the external charging is cancelled in conjunction with a door unlock operation not intended to start the operation of the vehicle at time ta in FIG. 7, charging connector 500 is maintained connected to charge inlet 21. Thus, history (D) is saved (S163).

Accordingly, which one of histories (C) and (D) is stored in storage device 320 of ECU 300 allows distinguishing whether the external charging is stopped by the door unlock operation (time t5) for the purpose of starting the operation of the vehicle in FIG. 6 or whether the external charging is stopped by the door unlock operation (time ta) not intended to start the operation of the vehicle in FIG. 7.

In the control process in FIG. 9, the user's connector unplugging operation corresponds to one embodiment of a "second user operation," history (C) corresponds to one embodiment of a "first charging stop history," and history (D) corresponds to one embodiment of a "second charging stop history."

Alternatively, the same process can be implemented by monitoring user operations other than unplugging of charging connector 500.

Figure 10:
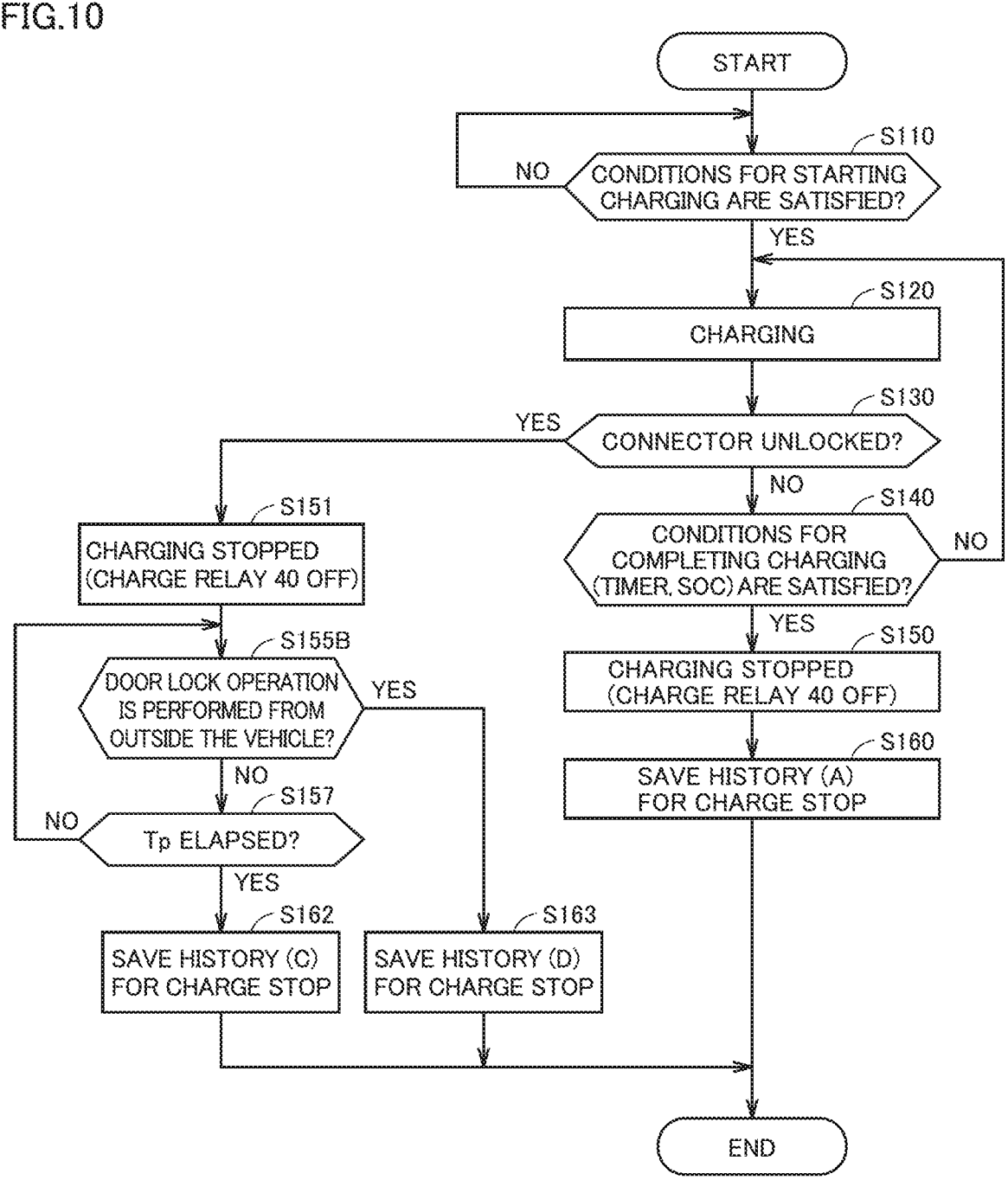
FIG. 10 is a flowchart illustrating a variation of the control process for saving the history when the external charging of the vehicle according to the embodiment is stopped.

FIG. 10 is a flowchart illustrating a variation of the control process for saving a history when the external charging of the vehicle according to the present embodiment is stopped.

In the variation illustrated in FIG. 10, ECU 300 is different from FIG. 9 in that it performs the process of S155B, in place of S155A in FIG. 9. The other steps illustrated in FIG. 10 are the same as those in FIG. 9, and thus the description thereof will not be repeated.

In FIG. 10 also, if the conditions for completing the charging are satisfied (if YES at S140) while the connector locked state is maintained, ECU 300 stores a charge stop history (A) into storage device 320 (FIG. 1) at S160.

During the external charging (S120) until the conditions for completing the charging are satisfied (NO at S140), if charging connector 500 changes from the connector locked state to the connector unlocked state (YES at S130), ECU 300 performs the same charge stop process as those in FIGS. 8 and 9 at S151, after which monitors user operations after the formation of the connector unlocked state at S155B and S157. Specifically, ECU 300 monitors presence or absence of a door lock operation, which performed from outside the vehicle with the user's electronic key 2 or operation switch 63, since the formation of the connector unlocked state until the elapse of a predetermined time Tp (if NO at S157). The determination at S155B can be made based on presence or absence of a user operation on electronic key 2 or operation switch 63.

If the door lock operation from outside the vehicle is present (YES at S155B), ECU 300 saves, at S163, a history (history (D)) indicating that the external charging is stopped in conjunction with the door being locked, as a charge stop history, into storage device 320 (FIG. 1) because the door lock operation from outside the vehicle is performed shortly after the door unlock operation.

In contrast, if no door lock operation from outside the vehicle is present until the elapse of Tp (YES at S157), ECU 300 saves, at S162, a history (history (C)) indicating that the external charging is stopped in response to a user operation including an intention to stop the charging, as a charge stop history, into storage device 320 (FIG. 1) because there is no door lock operation from outside the vehicle shortly after the door unlock operation.

According to the control process of FIG. 10, when the external charging is cancelled in conjunction with a door unlock operation not intended to start the operation of the vehicle at time to in FIG. 7, after the process of S151 upon the NO determination at S130, history (D) is saved (S163) in response to the door lock operation performed from outside the vehicle at time tb. In contrast, when the external charging is cancelled in conjunction with the door unlock operation for the purpose of starting the operation of the vehicle at time t5 in FIG. 6, history (C) is saved (S162) in response to absence of door lock operation performed from outside the vehicle.

Accordingly, by the control process of FIG. 10 also, which one of histories (C) and (D) is stored in storage device 320 of ECU 300 allows distinguishing between cancellation of external charging in conjunction with the door unlock operation (time t5) for the purpose of starting the operation of the vehicle in FIG. 6 and the door unlock operation (time ta) not intended to start the operation of the vehicle in FIG. 7.

In the control process of FIG. 10, the door lock operation performed from outside the vehicle corresponds to one embodiment of the "second user operation," history (C) corresponds to one embodiment of the "first charging stop history," and history (D) corresponds to one embodiment of the "second charging stop history."

As such, with the vehicle according to the present embodiment, when external charging is cancelled upon connector unlock in conjunction with door unlock, a charging stop history can be saved so that information for troubleshooting a cause of user discomfort can be provided. Specifically a charge stop history can be kept to distinguish the cases illustrated in FIGS. 6 and 7, distinguishing an external charging stop upon a user operation including an intention to stop the charging and an external charging stop in conjunction with the door unlock operation. In particular, history (D) is distinguished from the other histories and saved, thereby allowing the user to be provided with information for troubleshooting a cause of user discomfort caused by a result of external charging.

At least when history (D) is stored, the user can be given a notification by notification device 90 using a screen display or the like, for example, at the start of operation of the vehicle, that the external charging is stopped in conjunction with a door unlock operation. Alternatively, at the start of operation of the vehicle, the user can be given a notification by notification device 90 using a screen display or the like with information indicating the external charging has been terminated for which one of histories (A), (C), (D). In this case also, when external charging is stopped in conjunction with the door unlock operation, a notification indicating so can be given to the user.

Alternatively, the charging stop histories are accumulated as logs in storage device 320, and thus information for troubleshooting the cause of the user discomfort can also be provided later by later reading the log out of ECU 300 (storage device 320) through a service center or the like. In other words, in the present embodiment, a way of application of the charging stop histories in which history (D) is distinguished from the others, is arbitrary.

While the present embodiment has been described with reference to distinguishing and storing histories (A), (C), (D), at least one of histories (A) and (C) may not be stored, insofar as history (D) is recorded. In this case, at least one of S160 and S162 is omitted from the processes illustrated in FIGS. 9 and 10. In this case also, at least the history (D) is saved. Thus, a charging stop history contributing to troubleshooting a cause of the user discomfort can be saved by keeping a history indicating that external charging is stopped in conjunction with a door unlock operation involving no user operation that includes an intention to stop the charging.

While the present embodiment has been described with reference to including both charge inlets 21 (AC) and 22 (DC) wherein charging connector 500 is connected to charge inlet 21, it should be noted that the same configuration as that of charge inlet 21, described with reference to FIGS. 1 to 4, can be applied to charge inlet 22 as well. Accordingly, the control process upon connection of charging connector 500 to charge inlet 22 can be performed in the same manner as the control process upon connection of charging connector 500 to charge inlet 22. Moreover, a vehicle that is provided with one charge inlet or three or more charge inlets can also yield the same advantageous effects by having the control process, performed upon connection of charging connector 500 to one charge inlet, in the same manner as the embodiment described above.

Moreover, while the present embodiment has been described with reference to the door unlock operation as the user operation (the first user operation) which does not directly instruct for the connector unlock but is a trigger for the connector unlock in conjunction therewith, a vehicle that includes other user operations in the trigger (the first user operation) can also yield the same advantageous effects as those of the present disclosure by interpreting the door unlock operation according to the present embodiment as the other user operations.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle equipped with a power storage device, the vehicle comprising:
    a charge inlet to which a connector provided at an end of a cable is to be electrically connected for supplying power from a power supply external to the vehicle;
    a connector lock device to mechanically lock the connector electrically connected to the charge inlet;
    a charger which is permitted to charge the power storage device using the power conveyed to the charge inlet, in a connector locked state in which the connector lock device mechanically locks the connector to the charge inlet; and
    a control device that instructs the connector lock device in the connector locked state to transition to a connector unlocked state in conjunction with a first user operation, the connector unlocked state being a state in which the connector is released from being mechanically locked, the first user operation being different from a user operation of directly instructing the connector lock device to release from the connector locked state, wherein
    the control device includes a storage unit for storing a charging stop history when charging of the power storage device by the charger is cancelled due to formation of the connector unlocked state during the charging, the charging stop history being different depending on presence or absence of a predetermined second user operation performed after the charging is cancelled.

2. The vehicle according to claim 1, wherein
    the storage unit stores with a first charging stop history and a second charging stop history distinguished, depending on presence or absence of the second user operation, the first charging stop history indicating that the charging has been stopped, involving a user operation including an intention to stop the charging, the second charging stop history indicating that the charging has been stopped in conjunction with the first user operation.

3. The vehicle according to claim 2, further comprising
    a notification device that gives a user, when the second charging stop history is stored, a notification that the charging has been stopped in conjunction with the first user operation.

4. The vehicle according to claim 2, further comprising
    a detector that detects whether the connector is in a connected state or in an unconnected state, the connected state being a state in which the connector is electrically connected to the charge inlet, the unconnected state being a state in which the connector is not electrically connected to the charge inlet, wherein
    the second user operation is an unplugging operation of unplugging the connector from the charge inlet, and
    when the detector detects a transition from the connected state to the unconnected state after the charging is cancelled, the storage unit, in response to the unplugging operation, stores the first charging stop history, and when the transition is not detected for a predetermined time period after the charging is cancelled, the storage unit stores the second charging stop history in response to absence of the second user operation.

5. The vehicle according to claim 4, further comprising
    a door lock device to lock opening and closing a door of the vehicle, wherein
    the first user operation is a door unlock operation, which is performed from outside the vehicle, of releasing a door locked state by the door lock device.

6. The vehicle according to claim 2, further comprising
    a door lock device for locking opening and closing of a door of the vehicle, wherein
    the second user operation is a door lock operation, which is performed from outside the vehicle, for causing the door lock device to transition from a door unlocked state to a door locked state, and
    the storage unit stores the second charging stop history in response to the door lock operation after the charging is cancelled, and stores the first charging stop history when no door lock operation is detected for a predetermined time period after the charging is cancelled.

7. The vehicle according to claim 6, wherein
the first user operation is a door unlock operation, performed from outside the vehicle, for causing the door lock device to transition from the door locked state to the door unlocked state.

8. The vehicle according to claim 1, further comprising
a door lock device to lock opening and closing a door of the vehicle, wherein
the first user operation is a door unlock operation, which is performed from outside the vehicle, of releasing a door locked state by the door lock device.

* * * * *